United States Patent
Baer

(10) Patent No.: US 8,357,917 B2
(45) Date of Patent: Jan. 22, 2013

(54) HIGH RESOLUTION MICROSCOPY USING AN OPTICALLY SWITCHABLE FLUOROPHORE

(76) Inventor: Stephen C. Baer, Cambridge, MA (US)

( * ) Notice: Subject to any disclaimer, the term of this patent is extended or adjusted under 35 U.S.C. 154(b) by 722 days.

(21) Appl. No.: 12/066,356

(22) PCT Filed: Sep. 11, 2006

(86) PCT No.: PCT/US2006/035782
§ 371 (c)(1),
(2), (4) Date: Mar. 10, 2008

(87) PCT Pub. No.: WO2007/030835
PCT Pub. Date: Mar. 15, 2007

(65) Prior Publication Data
US 2012/0112095 A1    May 10, 2012

(51) Int. Cl.
*G01N 21/64* (2006.01)
(52) U.S. Cl. .................. 250/459.1; 250/458.1
(58) Field of Classification Search ............. 250/459.1
See application file for complete search history.

(56) References Cited

U.S. PATENT DOCUMENTS

| | | | | |
|---|---|---|---|---|
| 5,866,911 A | * | 2/1999 | Baer | 250/458.1 |
| 2004/0212799 A1 | * | 10/2004 | Hell | 356/317 |
| 2005/0227310 A1 | * | 10/2005 | Thomas | 435/34 |

* cited by examiner

*Primary Examiner* — Marcus Taningco

(57) ABSTRACT

The invention relates to a method for high resolution visualization of a compound that can be switched by a switching signal from a state of low fluorescence to a state of higher fluorescence, and then revert to the state of low fluorescence. Said switching signal is directed to a spot in a region of a material containing said compound, and an optical signal adapted to lower the probability that said switching signal will successfully switch said compound to said state of higher fluorescence is directed to said spot and shaped to have a minimum in said spot, such that the probability that said switching signal successfully switches said compound is greatest at said minimum. Said spot containing both said switching signal and said optical signal is scanned over said region of said material while monitoring the fluorescence from said compound in said spot to create an image of said region. In some embodiments of the invention a plurality of spots are simultaneously scanned, to reduce the imaging time.

11 Claims, 4 Drawing Sheets

02 04 06 01 03 05 07 09 11 13 08 10 12 14 16 18 20 15 17 19 21
42 40 38 36 41 39 37 35 33 31 29 34 32 30 28 26 24 22 27 25 23
44 46 48 43 45 47 49 51 53 55 50 52 54 56 58 60 62 57 59 61 63

HIGH RESOLUTION MICROSCOPY USING AN OPTICALLY SWITCHABLE FLUOROPHORE

CROSS REFERENCE TO RELATED APPLICATION

This application claims priority from U.S. Provisional Patent Application Ser. No. 60/715,480 filed 10 Sep. 2005, the entire disclosure of which is hereby incorporated by reference.

FIELD OF THE INVENTION

The present invention relates to microscopy and more particularly to methods for increasing resolution in fluorescence microscopy. Still more particularly, the invention relates to methods for resolution enhancement wherein the effective diameter of the point spread function of a scanned spot is reduced by selectively reducing fluorescence in its periphery.

BACKGROUND OF THE INVENTION

The present invention is in the area of optical technology in which resolution of an image forming process is improved by reshaping the point spread function of a diffraction-limited spot or line to decrease intensity in its periphery compared to its center, thereby reducing its effective diameter or width. The original examples of this point spread function sculpting technique applied to fluorescence microscopy (Hell, U.S. Pat. No. 5,731,588, Baer, U.S. Pat. No. 5,866,911), now called STED (Stimulated Emission Depletion) microscopy, employed a light pulse wavelength able to induce stimulated emission, and used a doughnut shaped intensity distribution with a central minimum that overlapped with the central maximum of the excitation spot to selectively deexcite those excited fluorescent molecules in the peripheral regions of the scanned spot.

Although this STED technique has been proven in practice and applied to biological studies, where it has demonstrated unprecedented resolution for far-field light microscopy, a major disadvantage is that each fluorescent molecule in the specimen can emit only one photon per reshaping event. To produce the maximum resolution enhancement with the technique, the intensity of each doughnut shaped pulse must be as high as possible, usually many times the energy of a saturating fluorescent excitation pulse. Because with STED, all this energy yields at most one fluorescent emitted photon per molecule, and because only a small minority of emitted photons is detected, to produce acceptable signal levels each pixel must summate the contributions of many excitation/doughnut/measurement events, with a resulting enormous doughnut beam power delivered to the specimen. One consequence is significant photobleaching, which currently is the main limiting factor in the STED technique. The low emission efficiency also results in long required integration times to produce an acceptable signal level, making the technique unsuitable for many biological studies. Furthermore, the STED technique, which in principle can deliver resolution limited only by available doughnut beam power, in practice delivers much more modest resolution gains to avoid specimen and dye damage from the doughnut beam.

One way to increase the fluorescence yield per sculpting pulse is to employ a fluorescent molecule capable of being switched into a non-fluorescent or "off" form by an optical switch over signal, that can be applied specifically to the peripheral parts of the excited spot, and such that following such off switching, the molecule can revert to the "on" state (Hell and Kroug, Appl. Phys. B 60:495(95), Hell, U.S. Pat. No. 7,064,824). If such a switch over signal is applied as a doughnut shaped beam to a spot of molecules in their normal ("on") fluorescent state, the result will be that a larger fraction of the molecules in the center of the spot will survive the doughnut pulse event in their "on" state than those at the periphery of the spot. Following the doughnut pulse, a surviving fluorescent molecule in the center of the spot will respond to a prolonged fluorescent excitation pulse with repeated excitation/emission cycles, so that it might emit a thousand photons before its fluorescence ends, for example, by photobleaching. Because there is a lower density of "on" fluorescent molecules in the periphery of the spot, the effective diameter of the spot is reduced.

In the original proposal by Hell and Kroug to use this "off-switching" method for microscopy resolution enhancement, the "off" state of the fluorescent molecule was a triplet state, unable to fluoresce. The "on" or normally fluorescing state was switched over to the "off" state by a doughnut shaped pulse of an appropriate wavelength. One problem with the use of the triplet state as the "off" state is that it requires a long dwell time per pixel, prolonging the image collection time. Another problem is that for a given mean lifetime of the triplet state, because of the stochastic nature of spontaneous decay from the triplet state, some of the triplet molecules will decay to the ground state more quickly than the mean, contributing fluorescence in unwanted parts of the spot, and other molecules delay their return, reducing their availability to contribute to subsequent pixels. Another serious problem is that the triplet state can lead to oxygen sensitization, and resulting tissue damage and permanent inactivation of the fluorophore.

The recently reported optically switchable ("photochromic") fluorescent proteins and dyes offer the possibility of implementation of this off-switching scheme, while avoiding some of the problems of use of the triplet state as the "off" state. Possible dyes include diarylethylene derivatives (Irie, Chem. Rev. 100:1685 (2000)) and (in oxygen-free environments) even the common biological fluorescent dyes Cy5 and Alexa 647 (Heilemann et al J. Am. Chem. Soc., 127:3801 (2005)). However for most biological microscopy applications, the switching proteins related to Green Fluorescent Protein (GFP) currently appear to have the advantage for resolution enhancement. Of these, a protein named Dronpa, derived and mutated from a coral protein (Habuchi et al, Proc. Nat. Acad. Sci 102:9511 (2005)), appears to be the best candidate of all, by far, except for one parameter. Dronpa can be efficiently, repeatedly and completely optically switched back and forth between fluorescent and non-fluorescent states. When in the fluorescent state, it has a very high fluorescence quantum efficiency in physiological environments. As a monomer, it can be incorporated into fusion proteins for labeling of subcellular structures, where it retains its superior optical characteristics, and where its relatively small size and lack of perturbation of structure would make it ideal for superresolution microscopy. It is commercially available, and is the subject of active searching for mutant forms, so it may soon be joined by relatives with different color output, rates of switching and other characteristics. Apart from its use to improve resolution of observation, its switching ability allows it follow cellular protein and organelle trafficking. And by substituting for GFP, it could become a component in the many of the systems developed for sensing local concentrations of ions, second messengers and other cellular parameters (Zhang et al, Nature Reviews 3:906 (2002)), but by allowing resolution enhancement, it could allow such measurements to be carried out with unprecedented spatial resolution.

The one parameter that Dronpa falls short on is light sensitivity to off switching, which is about 1000 times less sensitive than Dronpa's sensitivity to on switching. Dronpa has a quantum efficiency of 37% for on switching (Habuchi et al Proc. Nat. Acad. Sci 102:9511 (2005)), which is similar to the efficiency of a good fluorophore to excitation, and therefore similar to the efficiency of the same fluorophore to stimulated emission deexcitation. Therefore to make up for this reduced sensitivity to off switching, to achieve a comparable resolution enhancement, the doughnut shaped pulse in an off-switching scheme with Dronpa requires about 1000 times the energy of such a doughnut shaped pulse with STED that a good fluorophore requires. Consequently, while with an off-switching scheme, Dronpa can yield about 1000 fluorescent photons per molecule for each doughnut shaped pulse, a thousand fold improvement compared to STED, each doughnut shaped pulse must have 1000 times the energy of a comparable STED doughnut shaped pulse, so the two effects substantially cancel each other out.

The result is substantially no net gain in the number of output photons per doughnut photon compared to STED. Mutants of Dronpa (eg., Dronpa-3) have been developed that are more sensitive to off-switching, but that same increased sensitivity switches the fluorescence off sooner during excitation, decreasing the number of photons per doughnut shaped pulse, at least partly eliminating the benefit of the increased sensitivity. Thus there remains a pressing need for a point spread function sculpting method to allow a switching dye or protein like Dronpa to emit many photons per doughnut pulse, but without requiring substantially more energy per doughnut pulse than STED. Such a method could allow up to a three order of magnitude improvement in the fluorescence out to doughnut power in ratio, and this improvement could translate into an enormous advance in reduction of photobleaching and tissue toxicity, improvement in resolution, and shortening image collection time.

OBJECTS AND ADVANTAGES

One object of the present invention is to allow point spread function sculpting to be used to enhance the resolution in scanning fluorescent microscopy, while maximizing the number of fluorescent photons emitted in comparison to the required irradiation of the specimen.

Another object of the present invention is to allow resolution enhancement beyond what would be practical with either STED or with the off-switching method of resolution enhancement.

Another object of the present invention is to allow microscopy at resolutions beyond the Abbe resolution limit, while maintaining good time resolution and minimizing specimen damage.

Another object of the present invention is to allow super-resolution microscopy of biological cells, using fluorescent proteins expressed in the cell examined, as well as with added fluorescent probes.

SUMMARY OF THE INVENTION

These problems are solved and these objectives are met in an exemplary embodiment of the invention using the fluorescent protein Dronpa applied to biological microscopy. Dronpa is expressed in the cell examined as a fusion protein with a chosen endogenous protein, to visualize the location of that protein in the cell. The "on" Dronpa molecules are enriched in the center of a scanned spot, not by selectively switching those in the periphery of the spot "off" as in the off-switching scheme, but by selectively preventing their switching on. This difference allows the doughnut beam to interact with a light receptive mechanism in the Dronpa molecule that can be up to a thousand times more sensitive than the "off" switch, and consequently the ratio of emitted fluorescent photons per doughnut photon in can improve by as much a factor of a thousand, a change that can have dramatic benefit in reducing tissue toxicity of the observation process, in resolution, and in the brevity of exposure time.

The upper left hand pixel in the field of the specimen to be examined is first exposed to a spot of 488 nm light (the "off wavelength") of sufficient energy to switch off all the Dronpa molecules in the spot. Next, the central part of the spot is exposed to a 200 femtosecond pulse of light at 405 nm (the on switching wavelength), as a diffraction limited spot centered on the pixel to be examined. Next, immediately after the pulse of 405 light, the spot is exposed to an intense pulse of light chosen to act on a state intermediate between absorption of a 405 nm photon and the subsequent protein turn-on, in such a way as block progression to the "on" state. Such a pulse, acting on this intermediate state, is shaped like a doughnut, with a substantially zero intensity center coinciding with the center of the pixel to be examined. The precise wavelength of this doughnut is chosen to quench the state of excitation caused in the Dronpa molecules by the previous 405 nm pulse, so that they fail to lead to the turn-on of the Dronpa. The only Dronpa molecules still able to progress to turning on after this pulse will be those lying near the central point of the doughnut, which thereby escape this quenching. Next, the spot is exposed to another long pulse of up to a few milliseconds of 488 nm light to excite fluorescence of the Dronpa molecules at the center of the spot, while fluorescence emission from the spot is measured by a photodetector, until emission stops after all the Dronpa molecules in the spot have been switched from the "on" state back to the "off" state by the excitation light. With Dronpa, the excitation wavelength is the same as the "turn-off" wavelength so after each "on" molecule emits many fluorescent photons, all the molecules in the spot will be in their "off" states. The process is then repeated on an adjacent pixel, but since, following the previous cycle, all the molecules are initially in their off states, the process can begin with the on pulse. This shortened cycle (not requiring an initial off pulse) is repeated, in a raster pattern, until the entire frame is measured. In the preferred embodiments of this invention, described below, many pixels are simultaneously observed, for much shorter frame exposure times.

The enormous improvement in the critical parameter of fluorescence output per doughnut beam photon is the result of fundamental differences from the off-switching method. The off-switching method applies the doughnut beam to fluorophore molecules in their "on" state, which is the same state that is measured. The present invention applies the doughnut beam to a state that is neither the "on" state nor the "off" state, but an intermediate state that, following its absorption by an appropriate wavelength photon, can lead to prevention of progression from the "off" to the "on" state. Therefore in the present invention, the state that the doughnut beam acts on is very different from the "on" state that is measured through fluorescence output. The light sensitivity of the target state of the doughnut shaped beam to optically induced blockage to progressing to the "on" state can as much as a thousand times greater than the light sensitivity of the "on" state to the "off switch" light. These differences allows the present invention, with a switching fluorophore like Dronpa, to dramatically outperform the off-switching method in many parameters.

Data in the Habuchi et al (Proc. Nat. Acad. Sci 102:9511 (2005)) paper suggests the existence of a short lived (14 ps) intermediate state that should be quenchable by stimulated emission during its lifetime. However this particular intermediate state would require very fast and precisely synchronized pulses. Therefore ideally the method would be used with a Dronpa mutant that had a longer such initial intermediate state. Some newer data, however (Dedecker et al, *Biophy. J.* 91: L45-L47 (2006)) suggest the existence of a much longer lived intermediate state in the switching on process, susceptible to quenching by the same wavelength, 405 nm, that switches Dronpa on, and as such, offers the hope that there may be very simple embodiments of the present invention, with much improved performance.

BRIEF DESCRIPTION OF THE DRAWINGS

The principles of the invention will be more particularly discussed with reference to the accompanying drawings in which.

MODES FOR CARRYING OUT THE INVENTION

Figure 1:
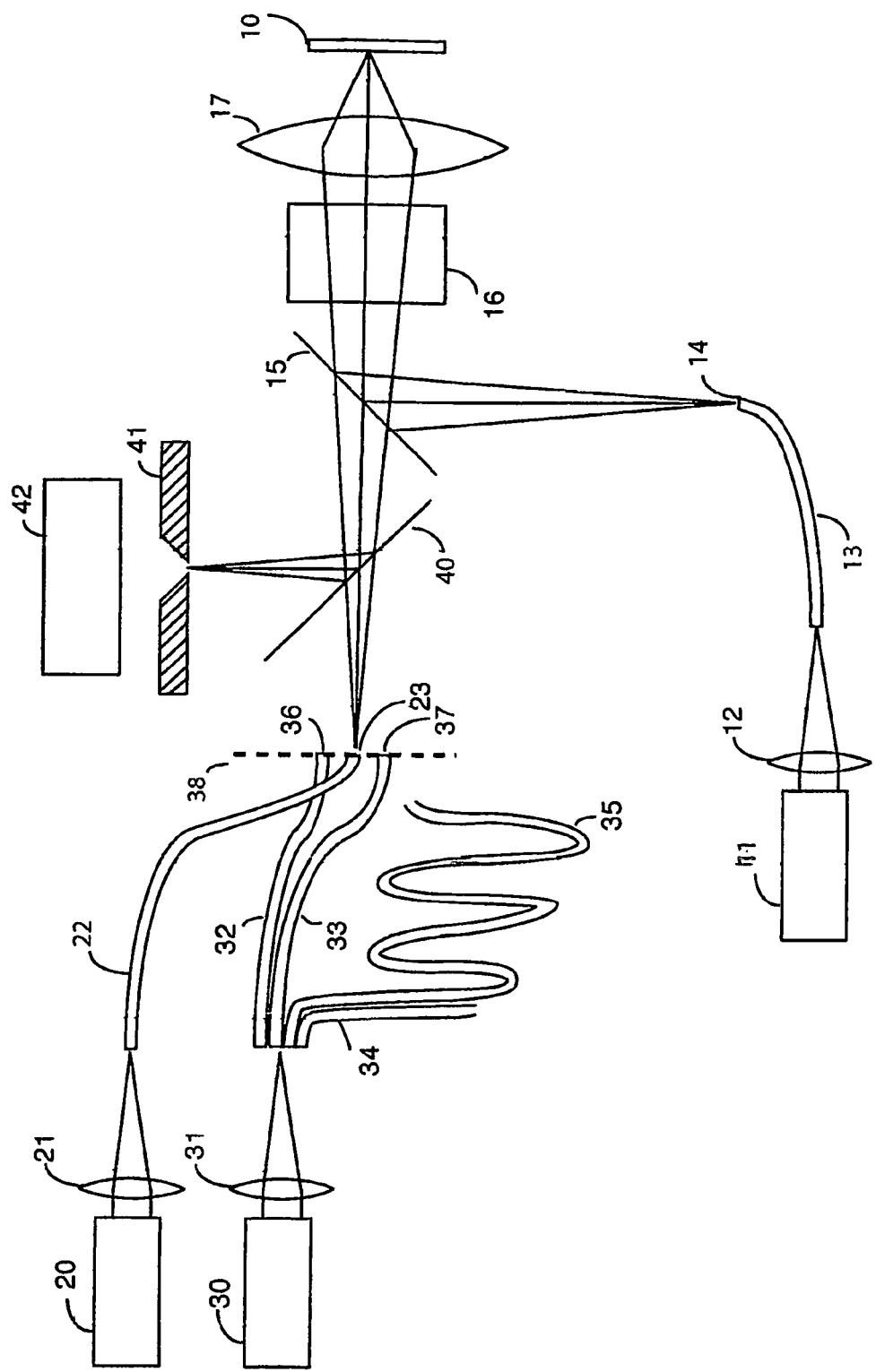
FIG. 1 is a schematic cross sectional view of a microscope using on-quench sharpening of Dronpa to increase resolution.

The first embodiment of the present invention to be described is a modification of a microscope described in FIG. 10 of Baer, U.S. Pat. No. 5,952,668, which is incorporated herein by reference. The specimen 10 contains cells that express the protein Dronpa in some chosen subcellular element to be visualized. The output of laser 11, at the wavelength 488 nm, effective as an "off" switch for Dronpa, is focused by lens 12 on one end of optical fiber 13, the other end 14 of which is in a real image plane, and following reflection by beam splitter 15, passage through x, y scanner device 16 and focusing by objective lens 17, the output of laser 11 is focused on a spot in specimen 10. We can imagine that the spot is initially at or near the upper left hand corner of a field to be raster scanned.

After sufficient time to thoroughly turn off the Dronpa molecules in the focused spot, laser 11 is turned off and laser 20 emits a 100 to 200 femtosecond pulse at 405 nm, a wavelength effective as an "on" switch for Dronpa. (The output of the laser could also have a 810 nm output, and could turn on the "on" state by two-photon absorption.)

The 405 nm pulse is immediately followed by a picosecond pulse from laser 30 at a wavelength adapted to quench the very transient excited state induced in "off" Dronpa molecules by the 405 nm pulse. Habuchi et al measured the lifetime of this transient excited state by a fluorescent emission at 440 nm that decayed in about 14 picoseconds. We assume here that this excited state can be quenched by an appropriate wavelength corresponding to stimulated emission to the first vibrational level of the ground state, and that this would probably be somewhere between 470 nm and 500 nm.

As described in the text corresponding to FIG. 10 of U.S. Pat. No. 5,952,668, the output of laser 30 (corresponding to laser 71 in that former patent) is focused by lens 31 onto the ends of four optical fibers 32, 33, 34 and 35, the other ends, of which 36 and 37 are shown in FIG. 1, are in the same plane of focus 38 as the end 23 of fiber 22. As explained in the '668 patent, the ends of fibers 32, 33, 34 and 35 (corresponding to fibers 100, 101, 102 and 103 in the '668 patent) are adjusted in a longitudinal axis so that spots are projected at the corners of a square with phases of 0°, 90°,180° and 270° as one progresses in a clockwise direction around the square. The magnification is such that in the real image plane of the specimen, the corners are about 2.3 optical units from the center of the square. This geometry should cause the quenching output from laser 30 to form a "doughnut" of substantially zero intensity in the center, and rapidly building up in intensity with distance from the center. The intensity of the beam from laser 30 is adjusted so that the intensity of the doughnut at, for example, ⅙ of the resolution limit from the center of the focused spot from laser 20, is such that the transient state produced by laser 20 has a 50% chance of being quenched. The result is that the action of the doughnut will contract the effective diameter of the spot of Dronpa molecules switched to the "on" state, to ⅙ of the diameter of the non-quenched on-switching beam. For better resolution the power of the quenching beam could be increased.

One skilled the art of STED microscopes will appreciate that laser 20 acts analogously to the excitation laser of a STED microscope, but here serves as an "on" switch, and laser 30 acts analogously to the quenching beam of a STED microscope, but here quenches the intermediate state produced by "on" switching beam rather than quenches the fluorescent excited state in the STED microscope. It will also be understood that other of the many reported schemes for producing so-called "STED doughnuts" might be suitable in the present application.

Following the switching of Dronpa molecules in a small region, substantially smaller than the Abbe resolution limit for a microscope of the wavelengths used, laser 11 is turned on again, this time to excite the Dronpa molecules that have been switched on. The use of laser 11 both for "off switching" and for excitation results from the fact that at least in Dronpa, the same wavelength, 488 nm, can serve in both roles. The fluorescent emission from the region of switched-on Dronpa molecules is collected by objective 17, descanned by scanner 16, transmitted by beam splitter 15, reflected by beam splitter 40 and after passing through confocal pinhole 41 is detected by light detector 42, and recorded in a frame-store digital memory for subsequent creation of an image of the chosen field of specimen 10. This collection of fluorescence from the on-switched molecules in the currently scanned part of the specimen continues until nearly all the molecules are switched to their off state by the excitation/off-switching pulse.

Confocal pinhole 41 has a particularly crucial role in those embodiments of the present invention based on the possible long lived intermediate state reported by Dedecker et al, where the "on" and the "on-quench" wavelengths may both have the wavelength of 405 nm. In order for the quenching light not to turn the protein on, it is necessary that it act on the intermediate state rather than the "off" state. At the outer margin of the doughnut/initial spot, there will always be either molecules that were initially off when exposed to the quenching beam, and so will be turned on by the second 405 nm pulse, or will be in the intermediate state but not effectively quenched by the quenching beam, so will progress to turn on. Confocal pinhole 41 eliminates fluorescence from these peripheral regions, so the only fluorescence measured comes from the central part of the spot.

If the off switching in the currently read out region were total, then it would be possible to scan to an adjacent pixel in the same horizontal scan line, and repeat the cycle, beginning with the brief "on" pulse from laser 20. In case, to speed up the scan process, it is desirable to scan to a new pixel before total photobleaching at the center of the spot, there might be a point several pixels away from that central point, where there are, on the average, a higher percentage of Dronpa molecules in their "off" state, because quenching of the "on" pulse would have been more complete so they never would have been switched on in the previous cycle.

Figures 2, 3:
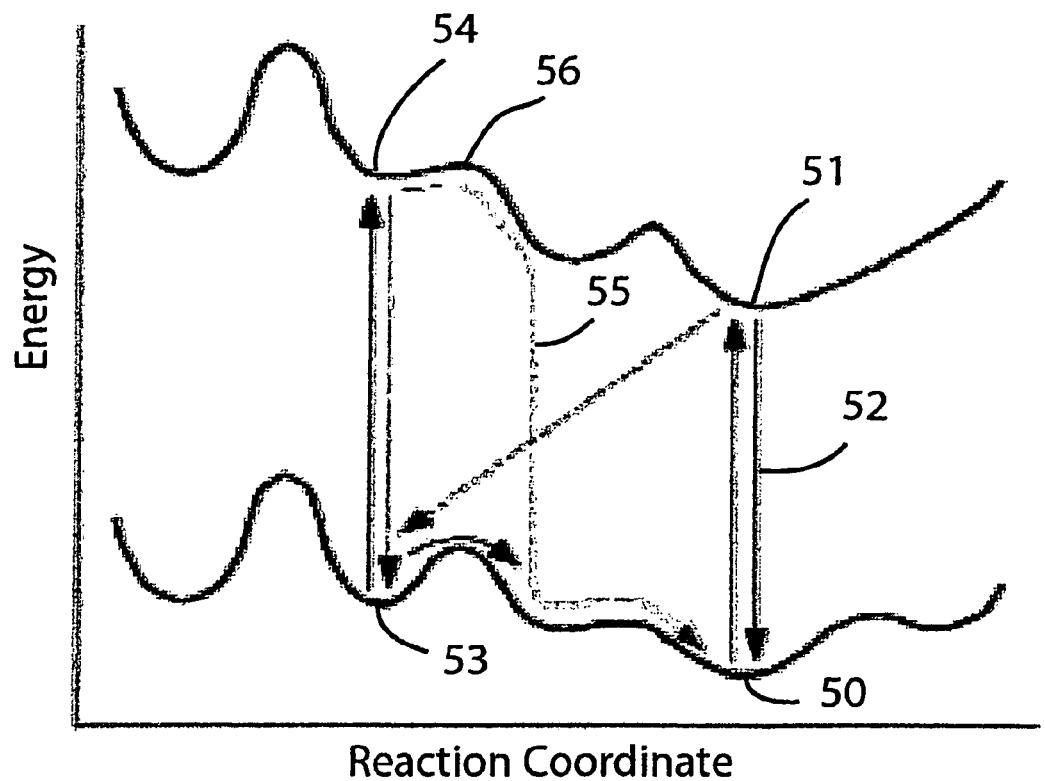
FIG. 2 is a chart illustrating a possible scan sequence for the first three scan lines of a frame, to minimize residual on molecules from interfering with subsequent measurements.
FIG. 3 is a simplified hypothetical schematic graph of energy vs. reaction coordinate for Dronpa.

FIG. 2 shows a possible pattern of scanning, where the scan begins with a pixel four pixels to the right of the upper left hand corner, then moves back left three pixels, then right four pixels, until the first horizontal block of seven pixels is filled, then the next block of seven pixels is filled, etc. until the last block of seven pixels. The next row is scanned right to left, using the reverse pattern, and then the third row is scanned left to right. In this way, the next scanned pixel has the benefit of at least three previous cycles of off-light, while being far enough from the previously turned on area of the last scanned pixel to have a low residual population of turned on molecules. In variations of this scheme, larger blocks of pixels, would allow successively scanned pixels to be separated by greater distances, to optimize a dark background level of turned-on Dronpa molecules.

Needless to say, this back and forth jumping imposes added demands on the scanning apparatus. However it should be remembered that the scan cycle has brief stage of at most a few hundred picoseconds (the on switching and quenching) followed by a much longer stage (the fluorescence excitation/off-switching). Of these, the brief stage is much more critical to resolution. Therefore, provided the instantaneous position of the laser beam could measured with great temporal and spatial resolution, if it is possible that the laser pulse could be triggered at precisely the right time that the beam is on the chosen pixel, and the pulse would act like a strobe light, avoiding any motion blur. For the longer pulse, ringing and aftershoot of the scan mirror would be tolerable, since the beam is a normal diffraction limited spot, which is large compared to the quench sharpened spot of on-switched molecules.

Habuchi et al presented (in FIG. 5 of their paper) a hypothetical graph of energy vs reaction coordinates for Dronpa's ground state and first electronically excited state. FIG. 3 in the present description shows a simplified version of their figure to illustrate a possible way to improve the performance of Dronpa-like proteins for high resolution microscopy according to the method of the present invention. Point 50 is the ground state of the "on" form of Dronpa. The absorption of a 488 nm photon by the state indicated by point 50 raises it to an electronically excited state shown by point 51. Because the protein is a very efficient fluorophore, the most likely decay route from the state at point 51 is by fluorescent emission, shown by the arrow 52 back down to the ground "on" state. Point 53 represents the "off" state, and this can be raised to its first electronically excited state shown by point 54 by absorption of a 405 nm photon.

In that hypothetical model, the excited state at point 54 decays primarily through a non-radiative path 55, which presumably is initiated when a random fluctuation in energy of the molecule reaches a level higher than the metastability barrier, shown schematically by point 56, whereupon the molecule continues to drop to the ground "on" state at point 50. With such an assumption, the very low lifetime of the fluorescence emitted from point 54 is directly related to smallness of the energy of the barrier 56, relative to the energy at point 54, so that if this barrier were raised slightly in a mutant form of Dronpa, it would take longer before the occurrence of a energy fluctuation able to bring it over the barrier, so there would be longer time available for fluorescent emission. We speculate further that if the height of point 55 were raised much higher, then most of the decay from point 54 would be by fluorescent emission, and the lifetime would be comparable to the lifetime of the emission from the "on" state of Dronpa, or a few ns. With these assumptions, one might imagine a series of mutant forms of Dronpa, differing only in the height of the energy represented by point 56, and thereby in both the lifetime of the excited state produced by absorption of a 405 nm photon by an off-state molecule, and the resultant probability of successful on-switching. If we can make the assumption that the height of point 56 effects only the time the molecule remains in the state represented by point 54 and not the probability of fluorescent emission per unit time when in that state, then even when the lifetime is extended perhaps to 100 ps, the great majority of molecules decay non-radiatively by the pathway 55, resulting in "on" switching. Thus with these assumptions, it should be possible to substantially extend the lifetime of the excited "off" state, without a comparable loss of the ability of 405 nm photons to serve as triggers to the "on" state.

In view of that interpretation of the Habuchi et al model, it may be productive to search for mutants of Dronpa, having properties very similar to the original Dronpa, but where the lifetime of the excited "off" state is extended from the original 14 ps to perhaps 100 to 200 ps. Compared with the original Dronpa molecule, a 405 nm "on" pulse in such an excited off-state extended lifetime mutant could be more totally quenched by a 1 to 2 ps quenching pulse because fewer molecules would have passed over the metastability barrier (point 56) to reach the "on" state before the offset of the quenching pulse.

It must be emphasized that it is not necessary that this or any other hypothetical model be correct for the present invention to work, but only that following a switch-on pulse applied to the dye or protein for a switching dye or protein there be a time window following that pulse when a pulse of light of an appropriate wavelength can reduce the likelihood that the switch-on pulse will result in successful switching on. Knowing the mechanism of this on-quenching is not necessary, though it could be helpful in rationally designing fluorophores better suited to the present invention.

Two of the three lasers in the device shown in FIG. 1, lasers 20 and 30, must be synchronized with great precision. To reduce the cost of the system, it may be possible to use a single laser to supply both the on switching on quenching light. In one possibility, a femtosecond Ti:Sapphire laser tuned near 1000 nm might act as an on switch, by exciting the blue end of the off state's 390 nm absorption peak with three-photon excitation, or perhaps could be frequency tripled to 333 nm. A beam-split portion of the same laser output stretched to one to a few ps and frequency doubled to 500 nm, might be able to quench the transient intermediate state, replacing laser 30. By adjusting the beam path lengths, the timing of the pulses could be precisely controlled. Baer Patent appl. WO 2006/078857, which is incorporated herein by reference, discusses ways to use a single pulsed laser for STED, and that discussion is directly relevant to use of a single laser to replace lasers 20 and 30 in the present invention.

There may be mutants of Dronpa for which frequency doubled and tripled outputs of a common wavelength might be more optimized to the relevant absorption peaks. It should be noted that the excitation/off-switching light would have much longer pulses, and a cw laser, perhaps a diode laser, that could be switched on and off as required, could inexpensively supply this light.

The recent paper by Dedecker et al (Biophys. J. 91:L45-L47 (2006)) suggests that in addition to the 14 ps intermediate state reported by Habuchi et al, Dronpa may have a second optically reversible intermediate state that is part of the chain leading from 405 nm photon absorption to protein turn on. The data in the paper suggests that second intermediate state is very sensitive to optically induced blocking and has a much longer life time than 14 ps. As such the intermediate state would be a far better target of the "on-quench" doughnut beam of the present invention than the initial 14 ps state. The paper has no data to suggest that any wavelength other than 405 nm has the ability to block progression to on, so 405 nm may turn out not to be the optimal wavelength for this role. However, even if 405 nm is not the optimal wavelength, the fact that 405 nm photons can serve at all in this role suggests an extremely simple embodiment of the present invention, where a region of a specimen containing only Dronpa molecules in their "off" state is exposed to a saturating pulse of 405 nm light, focused to a spot, so that in the time following the pulse and before the intermediate state can progress to turn-on, all the Dronpa molecules in the spot are in an intermediate state. Then, after an optimal delay, a doughnut pulse is presented concentric with the previous pulse, but this time the 405 nm photons act to inhibit progression to on, so only Dronpa molecules in the central region of the spot are eventually turned on. One pulsed laser with a beam split output could then substitute for lasers 20 and 30 of FIG. 1, without requiring the frequency conversion of the scheme described above, and laser 11 could be an electrically switched diode laser, so cost of the instrument could be quite low.

It is important to note that in the optical selection process that lead to choosing the Dronpa mutant, there was obviously no attention paid to parameters such as the length, sensitivity and action spectra of intermediate states. Therefore it is expected that with random mutation and appropriate optical testing of the mutants to measure criteria relating to this intermediate state, mutants much more optimized to the present technique could be selected. It is extremely encouraging that Dronpa in its present form may already possess a set of parameters that can lead to a particularly simple and effective embodiment of the present invention.

Figure 4:
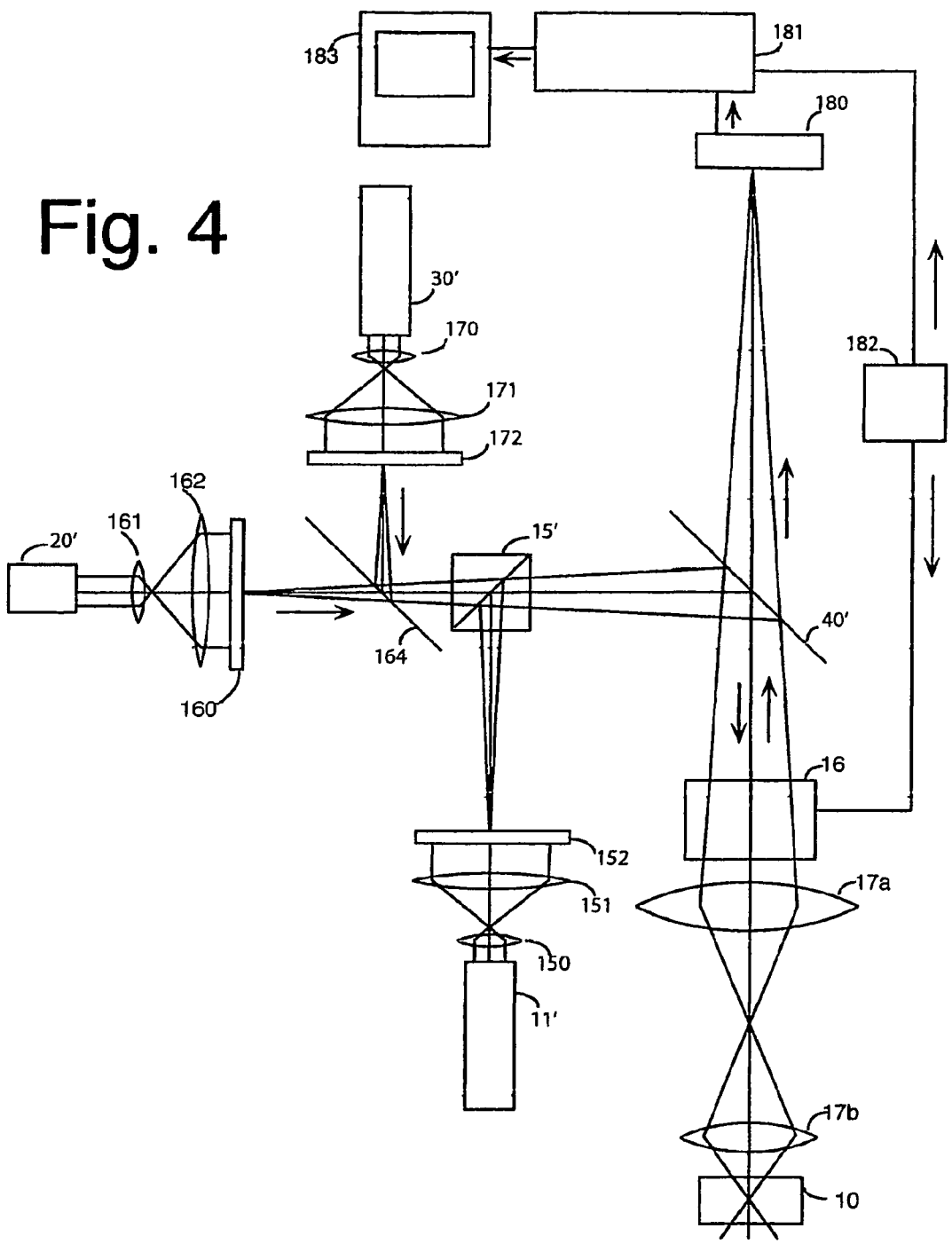
FIG. 4 is a schematic cross sectional view of the preferred form of the invention, where many points of a specimen are simultaneously examined.

Even with rapid readout of the fluorescence of the "on" Dronpa molecules, it may take several hundred µs for a full turn-on-pulse/doughnut pulse/excitation-pulse cycle, so that with a million pixel image, strictly serial scanning might require several hundred seconds per frame. The microscope of FIG. 4, which is the preferred form of the present invention, shows a simple way to introduce parallelism in to the scanning process. The process begins with an "off" pulse of light from laser 11', which is analogous to laser 11 from FIG. 1. The output of laser 11' is expanded by lenses 150 and 151 to be incident on a 100×100 lens microlens array 152, that produces a matrix of 100×100 spots of off-switching light at a real image plane of the microscope. Light from array 152 is reflected from polarizing beam splitter 15', that is analogous to beam splitter 15 of FIG. 1, and is reflected off of beam splitter 40', which may be a dichroic beam splitter, to pass through the two dimensional scanner 16 and then lenses 17a and 17b to be focused on the real image plane of specimen 10, containing a switchable protein such as Dronpa, where it turns off the protein in a 100×100 matrix of spots.

Next the protein in these same spots is turned on. Laser 20', which is analogous to laser 20 of FIG. 1, produces an output pulse beam at the on-switching wavelength that directed onto a 100×100 microlens array 160 after being expanded by lenses 161 and 162. Microlens array 160 produces a 100×100 matrix of illuminated points at a real image plane, and light from that plane passes through beam splitter 164, beam splitter 15', is reflected off of beam splitter 40', to pass through scanner 16 and then is focused by lenses 17a and 17b onto the real image plane of specimen 10, on the same 100×100 matrix of points that had just been turned off.

Figure 5:
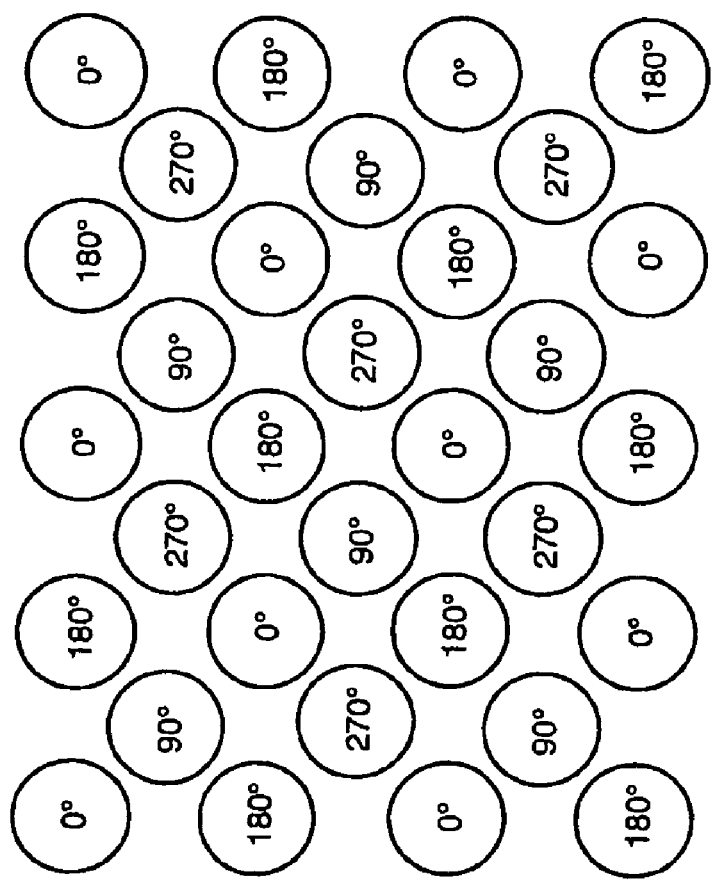
FIG. 5 is a plan view of a phase mask, designed to create a square matrix of doughnut shaped intensity distributions to use in the device of FIG. 4.

Next, a pulsed beam of light from the on-quench laser 30', which is analogous to laser 30 from FIG. 1, is expanded by lenses 170 and 171 to be incident on the real image plane phase mask 172, a portion of which is schematically illustrated in FIG. 5, where the angles in the figures indicate the respective phase retardations in the circular areas. As explained in Baer, U.S. Pat. No. 6,259,104, which is incorporated herein by reference, such a phase mask in the real image plane will produce a matrix of doughnuts with zero intensity centers. The number and positions of the phase retarding areas on the plate, shown in FIG. 5, are chosen so that the centers of these doughnuts are made to coincide with the centers of the spots that had just been exposed to the on switching beam, resulting in prevention of Dronpa turn on, except in the centers of the spots. (it should be noted that the parts of phase mask 172 outside of the circles in the illustration of FIG. 5 are opaque, or the phase retarding areas are in a square matrix, with no space between adjacent areas).

Finally laser 11' is turned on for, say 500 µs, and with sufficient intensity to cause the molecules of Dronpa in the specimen conjugate to the foci of microlens array 152, to emit their full capacity of fluorescent photons, before turning off. This fluorescent light emitted from these molecules is directed by lenses 17a and 17b, back through scanner 16 and focused on a 100×100 detector array 180, with each detector focused on one of the spots in the 100×100 matrix of illuminated spots in specimen 10. The output of detector array 180 is sent to frame store 181, such that the output of the detector corresponding to the upper left hand pixel of the frame is sent to the frame store address corresponding to the upper left corner of the frame. The output of the adjacent detector is sent to the address corresponding to pixel 11 of the upper line of the frame. The output of the next detector is sent to pixel 21, etc. The next line from the top of the detector array is sent to pixels 1, 11, 21, 31 etc. of line 11 of the frame store 181. The line below that is sent to pixels 1, 11, 21 etc of line 21 of the frame store 181 etc.

Following the readout of the first set of points, the scanner driver 182 moves the scanner one pixel to the right, and the process repeats with an "on" pulse from laser 20'. The output of detector array 180 is sent to pixels 2, 12, 22, 32 etc. of the first line, pixels 2, 12, 22, 32 etc. of the 11th line, pixels 2, 12, 22, 32 etc. of the 21st line, etc. After a total of 100 repetitions of the cycle, taking somewhat more than 100×500 µs=50 ms, the frame store is full, and the frame is imaged on monitor 183. Needless to say, the same considerations that lead to the proposal of the non-adjacent pixel scanning patterns shown in FIG. 2 may apply here, in which case, for example, the second subframe could start on pixel 5 of the upper line rather than pixel 2 described in the consecutive scheme above, the third subframe could start on pixel 10, in the sequence (1, 5, 10, 3, 6, 9, 2, 8, 4, 7) so that successive pixels read out in successive sub-frames have a separation of at least two intervening pixels.

Although this scanning process operates at 20 Hz and so has the capability of rapid z scanning for high depth of field, for many, if not most microscopic visualization applications, it would be desirable to produce high depth of field from a single frame of scanning. Baer, Pat. appl. WO 2006.078856, which is incorporated herein by reference, teaches how a holographic image of an illuminated needle in the specimen can replace the image in the specimen of the illumination pinhole in STED microscopy and a holographic image of an illuminated hollow needle surrounding the image of the first illuminated needle can replace the doughnut beam of STED, to produce, in a single scan, an image with arbitrarily high depth of field. That concept could be applied to the microscope of FIG. 4 by replacing microlens array 160 with a hologram of a 100×100 array of illuminated needles and replacing phase mask 172 with a hologram of a 100×100 array of hollow needles imaged in the specimen 10 so that each hollow needle was concentric with an illuminated needle. As taught in Pat. appl. WO 2006.078856, it is also possible that a single volume hologram could replace both the needle hologram and the hollow needle hologram, and it is possible to create an illusion of stereopsis by creating two sets of these needles tilting in opposite directions from the optical axis, and imaging one set for the left eye and the other set for the right eye.

It should be evident to one skilled in the art that although for simplicity, lasers 20' and 30' were shown as separate, the required "on" and "on-quenching" roles could be produced by beams deriving from a single pulsed laser, with a beam split output as discussed above for the microscope of FIG. 1. Thus, in that case, the device of FIG. 4 could be implemented quite simply.

The well developed process of random mutation and optical selection of fluorescent proteins, coupled with rational design of variants has the potential to evolve many desirable mutant forms of switching fluorescent proteins, adapted to having different emission wavelengths and fluorescent lifetimes in order to optically discriminate different targets in the same specimen, adapted to schemes for single laser operation, and in general adapted to better implementing the present invention, compared with the original Dronpa. Another route to switching fluorophores is through small fluorescent molecules such as Cy5, recently shown to be reversibly optically switchable between fluorescent and non-fluorescent states (Heilemann et al J. Am. Chem. Soc. 23:3801(05)). Because oxygen interferes with such switching, perhaps the dye molecule could be sequestered in the pore of a cyclodextrin host. Furthermore pairs of dye molecules could be sequestered together in such a pore, such as the Cy3/Cy5 pair shown by Bates et al (Phys. Rev. Lett. 94: 108101 (05)) to function together as an efficient reversible switching fluorophore. By choosing appropriate dyes to function as acceptor and receptors in such a configuration, it should be possible to quickly create sets of dyes having a common on- and quench-wavelength, but different emission and/or fluorescence lifetimes, for dye discrimination coupled with high resolution.

Still another approach to rapid development of fluorophores adapted to the present invention would make a fusion between Dronpa or a readily photobleachable fluorescent protein and the tetracysteine motif that can specifically bind to biarsenical-conjugated dyes (Adams et al, J. Am. Chem. Soc. 124:6063(02)). The dye would be selected to be both excitable at a convenient wavelength, in terms of the available lasers, and to participate in the turn-on of the bleached protein in the way Cy3 contributes to the turn-on of a photobleached Cy5. Nevertheless, as has been stated, Dronpa by itself and proteins derived from it by mutation would appear to have distinct advantages with the present proposed technique.

In the examples given, the doughnut beam photons interacted directly with the same molecule whose fluorescent emission was measured. However it is possible to imagine an embodiment of the present invention where the doughnut beam interacted with a molecule different from the molecules directly supplying the measured fluorescence, such that the excitation of that different molecule reduced the likelihood that an on switching photon received by the measured fluorophore will lead to successful on switching. In the examples given, the doughnut beam was presented after the on switching pulse, however it is possible to imagine embodiments of the present invention where a doughnut beam presented before or concurrently with the on switch would decrease the likelihood that the on switch photon will lead to successful on switching. The examples given have referred specifically to microscopes, though the invention might also be applied to other optical instruments where diffraction limits resolution. The term "quenching" as used herein refers not just to stimulated emission quenching, but more generally to optically interacting with an intermediate state between absorption of an on switching photon and the eventual successful protein turn on caused by that absorption, so as to reduce the likelihood of such turn on. Although the examples given applied specifically to optical fluorescence, analogous processes exist with other forms of radiation, where one form of radiation interacts with a particular substance to generate another form of radiation, which is detected, carrying information about the substance, and one skilled in the art will understand how the present invention may apply to such a fluorescence analog. Furthermore one skilled in the art may imagine many alternatives to the examples given to implement the present invention. Therefore the present invention should not be limited by the examples given but defined only by the following claims.

The invention claimed is:

1. A method for increasing resolution in imaging an object to be examined comprising the steps of:
    providing a fluorescent compound in said object that can be switched from a state of low fluorescence to a state of higher fluorescence by an on switching wavelength, can revert from said higher fluorescence state to said low fluorescence state, and which in switching from said low fluorescence state to said high fluorescence state exists for a short time in at least one intermediate state that is distinct from both said low fluorescence state and said high fluorescent state;
    providing a pulse of light adapted to interact with said intermediate state to reduce switching to said high fluorescence state;
    shaping said pulse so that at least one region of said object is in a minimum of such pulse; and
    measuring said fluorescent compound in said high fluorescence state in said at least one region.

2. The method of claim 1, wherein said switching signal is in a first pulse and said pulse of light adapted to interact with said intermediate state is in a pulse that follows said first pulse.

3. The method of claim 1 wherein said fluorescent compound is a photochromic dye or protein.

4. The method of claim 1 wherein said at least one region of said object is scanned to create an image of said object.

5. The method of claim 2 wherein said minimum has substantially zero intensity.

6. For a compound that can be switched from a first state with a first set of spectral properties by way of a short lived intermediate state to a second state having a second set of spectral properties different from said first set of spectral properties, and can return from said second state to said first state, a method of measuring with high resolution the distribution of said compound in a material to be examined comprising the steps of:
  providing light of a first wavelength able to switch said compound from said first state to said second state;
  providing light adapted to interact with said intermediate state to reduce or delay said switching to said second state;
  shaping said light adapted to interact with said intermediate state so that at least one region of said material is in a minimum of such light adapted to interact with said intermediate; and
  optically measuring the concentration of said compound in said second state at said at least one region.

7. For a compound that can be switched by an optical switching signal from a first state with a first set of spectral properties to a second state with a second set of spectral properties different from said first set of spectral properties, and which can return from said second state to said first state, a method of measuring the distribution of said compound at high resolution in a region to be examined comprising the steps of:
  providing light of a wavelength able to reduce the likelihood that said switching signal can successfully switch said compound from said first to said second state, by interacting with a state that is different from said first state of said compound or said second state of said compound;
  shaping said light into a pattern with a minimum in a location within said region; and
  measuring at least one spectral property in said location to determine the concentration of said compound in said second state.

8. For a compound that can be switched by a switching signal from a state of low fluorescence to a state of higher fluorescence, and can revert to said state of low fluorescence, a method of improving the resolution of visualization of said compound in a material to be examined comprising the steps of:
  providing an optical signal that can lower the probability said switching signal can switch said compound to said state of higher fluorescence by interacting with a state that is different from said state of low fluorescence and from said state of high fluorescence;
  shaping said optical signal into a pattern with a minimum at at least one location in said material; and
  measuring the fluorescence of said compound in said state of higher fluorescence in said material at said at least one location.

9. For a compound that can be switched by a switching signal from a state of low fluorescence to a state of higher fluorescence, and can revert to said state of low fluorescence, a method of improving the resolution of imaging of said compound in a material to be examined comprising the steps of:
  directing said switching signal to at least one region in a material to be examined;
  providing an optical signal that can lower the probability that said switching signal will switch said compound to said state of higher fluorescence, wherein said optical signal that lowers the probability that said switching signal will switch said compound to said state of higher fluorescence acts on a state that is different from said state of low fluorescence of said compound and said state of higher fluorescence of said compound;
  shaping said optical signal into a pattern with a minimum at at least one location in said at least one region; and
  measuring the fluorescence of said compound in said state of higher fluorescence in said material at said at least one location.

10. Apparatus for high resolution imaging of the distribution in a material of a compound that can be switched by a switching signal from a state of low fluorescence to a state of higher fluorescence, and can revert to said state of low fluorescence comprising:
  optical components to direct said switching signal to at least one region in a material to be examined;
  a source of an optical signal that can lower the probability that said switching signal will switch said compound to said state of higher fluorescence, wherein said optical signal that lowers the probability that said switching signal will switch said compound to said state of higher fluorescence acts on a state that is different from said state of low fluorescence of said compound and said state of higher fluorescence of said compound; and
  a measuring device for measuring the fluorescence of said compound in said state of higher fluorescence in said material at said at least one location.

11. The apparatus in claim 10, wherein said optical signal is shaped to have a beam with a cross section having a minimum, such that said beam is directed to said at least one location.

* * * * *